US006491873B2

(12) United States Patent
Roberts et al.

(10) Patent No.: US 6,491,873 B2
(45) Date of Patent: Dec. 10, 2002

(54) MULTI-WELL FILTRATION APPARATUS

(75) Inventors: Roger Q. Roberts, Laguna Niguel, CA (US); Michael R. Woelk, Trabuco Canyon, CA (US)

(73) Assignee: Varian, Inc., Palo Alto, CA (US)

( * ) Notice: Subject to any disclaimer, the term of this patent is extended or adjusted under 35 U.S.C. 154(b) by 55 days.

(21) Appl. No.: 09/767,500

(22) Filed: Jan. 23, 2001

(65) Prior Publication Data

US 2002/0098125 A1 Jul. 25, 2002

(51) Int. Cl.⁷ .............................. B01L 11/00; B01L 3/02; B01L 3/00; G01N 1/10; B65B 31/04
(52) U.S. Cl. ....................... 422/101; 422/100; 422/102; 422/103; 141/65; 436/180
(58) Field of Search ................................. 422/100–104, 422/68.1; 141/65; 436/180

(56) References Cited

U.S. PATENT DOCUMENTS

| | | | |
|---|---|---|---|
| 4,090,850 A | * | 5/1978 | Chen et al. |
| 4,301,010 A | * | 11/1981 | Eddleman et al. |
| 4,734,192 A | | 3/1988 | Champion et al. .......... 210/335 |
| 4,797,259 A | * | 1/1989 | Matkovich |
| 4,895,706 A | * | 1/1990 | Root et al. |
| 4,902,481 A | | 2/1990 | Clark et al. ................. 422/101 |
| 4,927,604 A | * | 5/1990 | Mathus et al. |
| 4,948,564 A | * | 8/1990 | Root et al. |
| 5,205,989 A | | 4/1993 | Aysta .......................... 422/101 |
| 5,219,528 A | * | 6/1993 | Clark |
| 5,227,137 A | * | 7/1993 | Monti et al. |
| 5,283,039 A | | 2/1994 | Aysta .......................... 422/104 |
| 5,603,900 A | * | 2/1997 | Clark et al. |
| 5,792,425 A | * | 8/1998 | Clark et al. |
| 5,792,430 A | * | 8/1998 | Hamper |
| 6,133,045 A | * | 10/2000 | Johnson et al. |
| 6,159,368 A | * | 12/2000 | Moring et al. |
| 6,338,802 B1 | * | 1/2001 | Bodner et al. |
| 6,309,605 B1 | * | 10/2001 | Zermani |
| 6,331,431 B1 | * | 12/2001 | Glaser et al. |
| 2002/0110925 A1 | * | 8/2002 | Mansky et al. ............. 436/180 |

\* cited by examiner

Primary Examiner—Jill Warden
Assistant Examiner—Brian R. Gordon
(74) Attorney, Agent, or Firm—Walter A. Hackler

(57) ABSTRACT

A multi-well filtration or solid phase extraction apparatus is provided which generally includes a vacuum collar adapted to be interconnected between a conventional 96-well sample application plate, or separation plate, and a 96-well collection plate. The vacuum collar provides an interface chamber between these plates through which a vacuum can be applied to assist in the filtration process. The collection plate may include a vent opening providing a direct communication between the interface chamber and a vacuum assembly air intake, when the collection plate is disposed on top of the vacuum assembly in a stacked configuration, thereby eliminating any need for separate vacuum manifolds or connectors.

14 Claims, 5 Drawing Sheets

MULTI-WELL FILTRATION APPARATUS

The present invention generally relates to filtration apparatus and more specifically relates to a multi-well filtration or solid phase extraction apparatus.

Multi-well filtration/solid phase extraction assemblies are well known in the art and are used for the assay of biological liquid specimens. Conventional filtration assemblies typically comprise a filtration plate, or separation plate, having multiple wells for receiving a liquid specimen, and a collection tray having a plurality of wells for collecting filtrate. The separation plate and the collection tray are disposed in a stacked relationship such that individual collection wells are associated each with a single filtration well. A conventional multi-well filtration plate has 96 wells for performing multiple assays simultaneously. Each well typically contains a separations media, for example a filter membrane, for separating a biological component from the liquid that is introduced into the separation plate, and allowing a liquid portion of the biological fluid to filter into the collection tray.

For many applications, a multi-well filtration/solid phase extraction assembly requires vacuum, positive pressure, centrifugation or other mechanical means to force the liquid through the separations media. A vacuum box useful for vacuum processing multiple biological samples in a multi-well filtration plate is described in U.S. Pat. No. 5,205,989 and U.S. Pat. No. 5,283,039, both to Aysta. Unfortunately, the Aysta vacuum box and other conventional vacuum assemblies that are designed to process multiple samples simultaneously, are costly, thereby discouraging many users from adopting the 96-well format for sample processing.

The present invention provides a low cost interface between a multi-well separation plate and the collection plate for enabling vacuum processing of multiple samples without need for an expensive vacuum assembly.

SUMMARY OF THE INVENTION

Accordingly, a multi-well filtration and solid phase extraction apparatus is provided by the present invention which is useful for facilitating vacuum processing of liquid biological samples using conventional multi-well separation plates and filtrate or waste collection plates. Advantageously, the present invention provides effective means for simultaneously vacuum processing multiple fluid samples without the need for a more expensive, conventional vacuum box. In one particular embodiment, the present apparatus generally comprises a unique vacuum collar that is adapted to be connected to, and in an interfacing relationship with, a 96-well separation plate and a 96-well collection plate.

The separation plate generally includes a plurality of filtration wells each including an inlet portion, and a relatively narrow outlet portion forming a nozzle-like tip. The filtration wells extend through a depth or thickness of the separation plate. A separation media is provided within each of the filtration wells for filtering a biological fluid sample to be assayed. Similarly, the collection plate includes a plurality of collection wells for receiving filtrate or eluate that is discharged from an associated one of the filtration wells.

Importantly, the vacuum collar, when interconnected between the separation plate and the collection plate, defines a substantially air-tight chamber. Means are provided for connecting the chamber to a vacuum source, such as an inexpensive vacuum pump assembly. For example, a hose barb connector extending through the collar and adapted to be connected to a vacuum hose is provided. In addition, means are provided for enabling manual control of pressure differential in the chamber in order to suit a particular application.

Preferably, the vacuum collar includes means, for example a keyed structure, for ensuring alignment between separation wells and collection wells. In another aspect of the invention, the vacuum collar is adapted to place each separation well discharge tip a specified distance into each collection well to ensure that eluates or filtrates will not contaminate adjoining collection wells. In addition, the vacuum collar may include other features which ensure proper connection of the separation plate and the collection plate each time the apparatus is used, thereby eliminating possibility of error in eluate or filtrate transfer.

In one particular embodiment of the invention, a multi-well filtration apparatus is provided in which the collection plate is adapted to be directly connected to a vacuum assembly in a stacked configuration. More specifically, the collection plate includes means, including a vent opening sized and structured to receive an air-intake member of the vacuum assembly when the collection means is disposed on the vacuum assembly in a stacked relationship.

BRIEF DESCRIPTION OF THE DRAWINGS

The present invention will be more clearly understood and the objects and advantages better appreciated by referring to the following detailed description considered in conjunction with the accompanying drawings of which.

DETAILED DESCRIPTION

Figure 1:
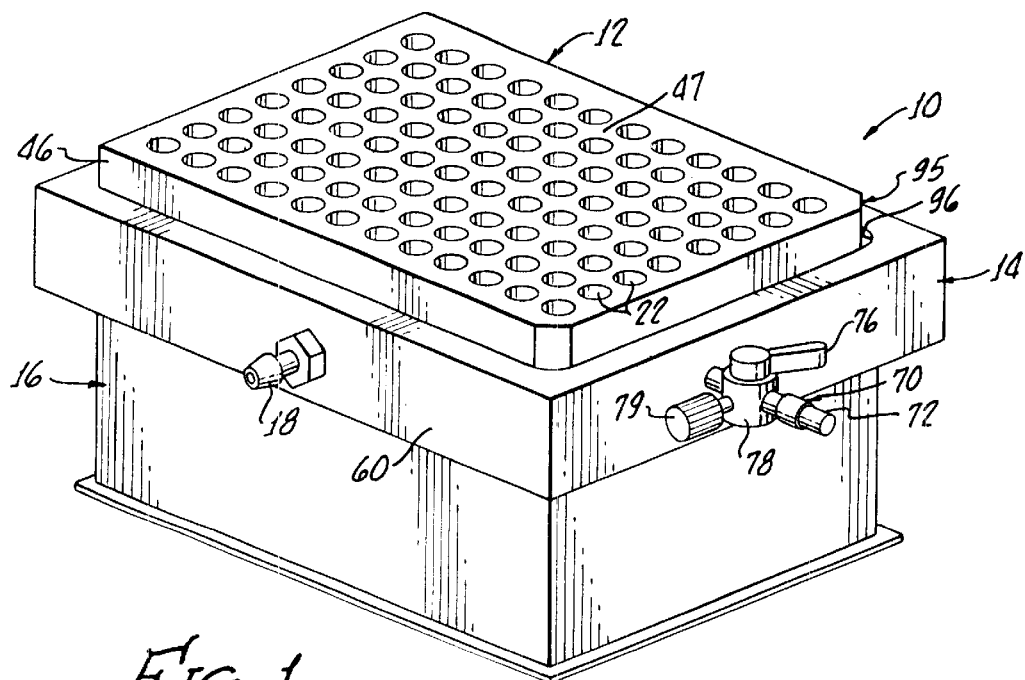
FIG. 1 shows a perspective view of a multi-well filtration apparatus in accordance with the present invention.
Figure 3:
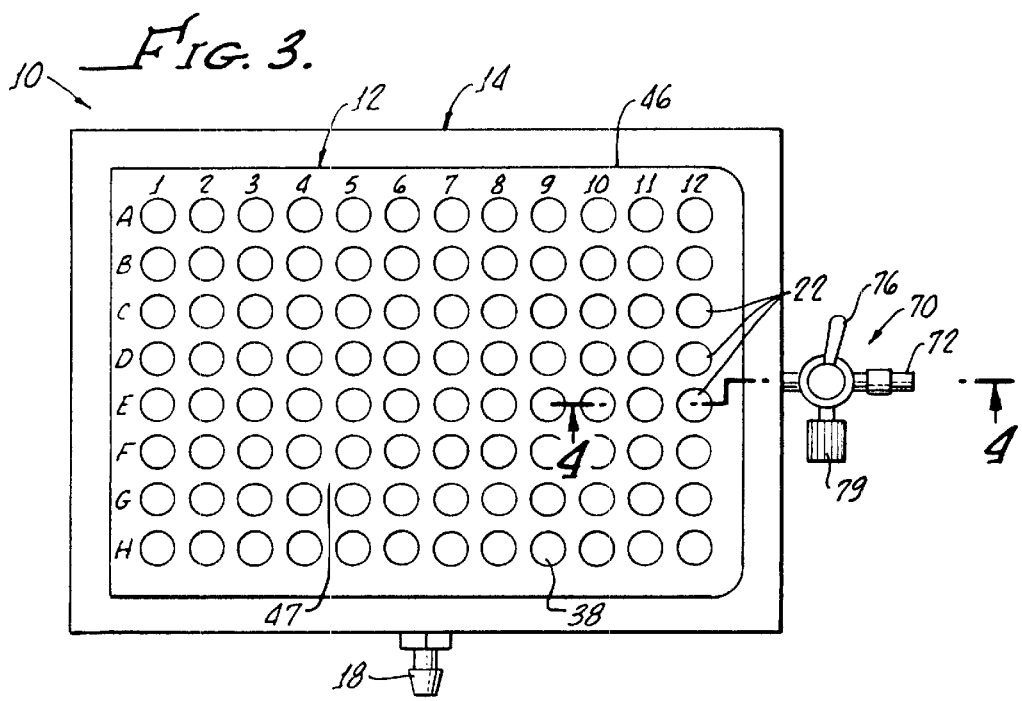
FIG. 3 shows a top view of the multi-well filtration apparatus shown in FIG. 1.
Figure 2:
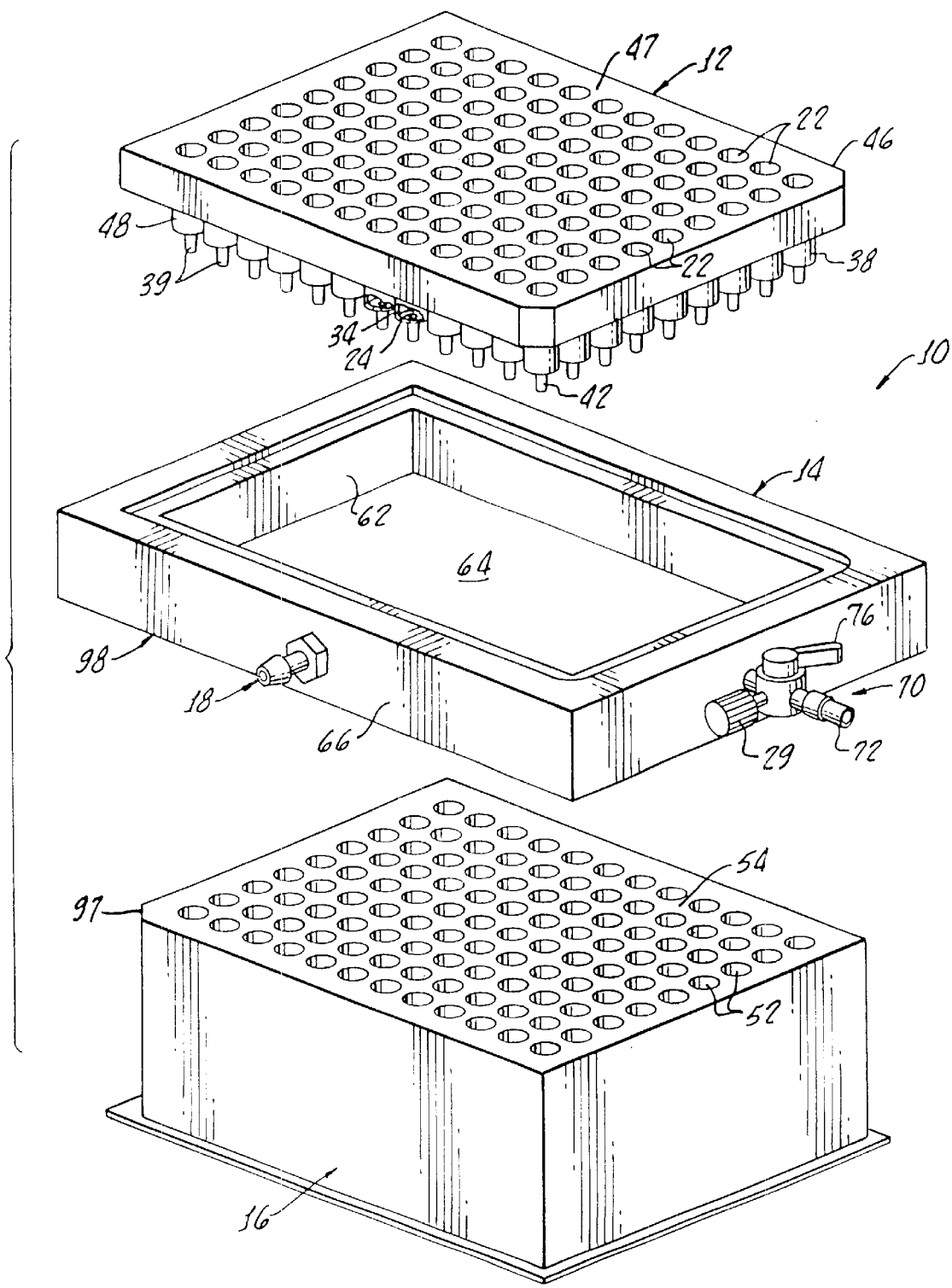
FIG. 2 shows an exploded view of the multi-well filtration apparatus shown in FIG. 1.

Turning now to FIGS. 1–3, a multi-well filtration apparatus 10 in accordance with the present invention is shown. The apparatus 10 generally includes a separation plate 12 adapted to receive a fluid, for example a blood specimen or other biological fluid, a vacuum collar 14, and collection means, or plate, 16 for capturing and containing components of the biological fluid passed through the separation plate 12. Means, for example a hose barb connector 18, for connecting the vacuum collar 14 to a vacuum source (not shown) is also included.

The separation plate 12, shown most clearly in FIG. 2, may comprise a conventional, multi-well separation plate. The separation plate 12 includes means, including a plurality of wells 22, for example 96 wells, for receiving multiple test samples of a biological fluid to be processed by filtration or solid phase extraction techniques. The separation plate wells 22 will hereinafter sometimes be referred to as "filtration wells". It will be appreciated that the number of wells 22 found in the separation plate 12 in the embodiment 10 shown is simply a matter of convenience for the analyst or investigator. The separation plate 12 may contain as few as one well, or as many wells as are functionally permissible to give the actual dimensions of the plate 12. Typical test samples of a biological fluid are often less than about 500 microliters in volume, and the wells 22 are sized appropriately to contain these small volumes. The separation plate 12 may be formed of any resilient and non-reactive material that is commonly available.

As shown in a cut-away portion of FIG. 2, a separation media, or filter, 24 is disposed generally at a bottom of each of the filtration wells 22 and functions to separate and retain components of the biological fluid as the fluid passes through the well 22. The separation media 24 comprises any filter, membrane, matrix or the like, in a single layer or multiple layers thereof, that is suitable for the application on hand.

Figure 4:
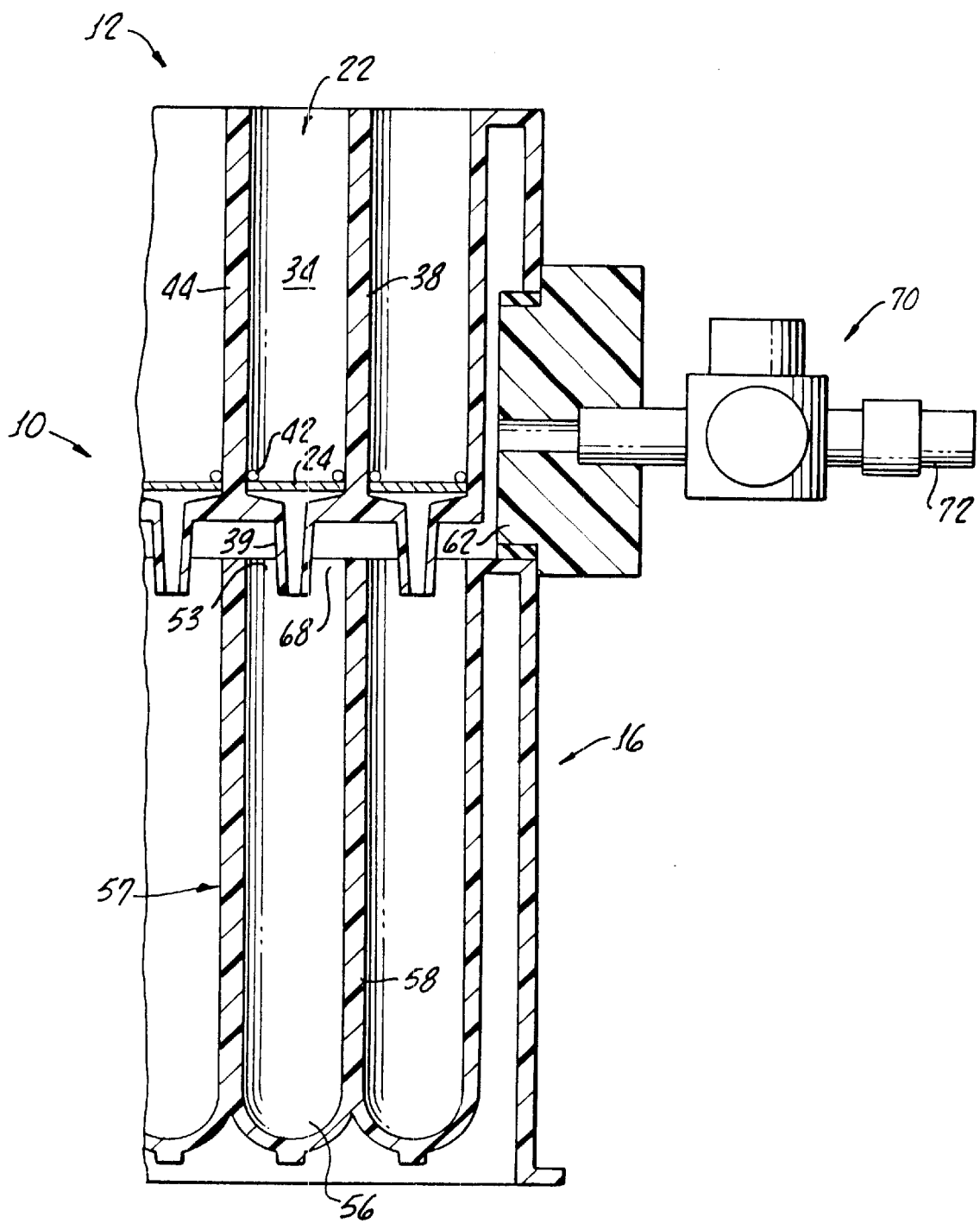
FIG. 4 shows a cross-sectional view of the apparatus taken across line 4—4 of FIG. 3.

Attention is directed specifically to FIG. 4. The separation plate 12 may be a substantially unitary, molded structure with each of the filtration wells 22 comprising a generally cylindrical aperture 34 extending through a full thickness, or depth, of the separation plate 12. More specifically, each filtration well 22 includes a relatively wide receiving inlet portion 38 and relatively smaller outlet portion 39 forming a nozzle-like tip. The filter 24 is disposed at the bottom of the inlet portion 38 as shown, and may be held in place by a retaining ring 42 or other conventional means. The inlet portion 38 of adjoining wells 22 may be defined by a common walls 44. Referring now to FIGS. 1–3, the separation plate 12 includes a substantially rectangular upper portion 46 having a face 47 in which the filtration wells 22 form a matrix arrangement as shown. Turning specifically to FIG. 2, the separation plate 12 further includes a lower portion 48 from which the nozzle-like tips 39 of the filtration wells 22 depend.

Referring now to FIGS. 2 and 4, the collection means 16 in the shown embodiment 10 comprises a multi-well collection plate. The collection plate 16 includes means, for example a plurality of wells 52, for receiving a liquid component, i.e. filtrate or eluate, of the biological fluid sample which is discharged from outlet tips 39 of the filtration wells 22. Each of the collection wells 52 has an inlet 53 defined in a face 54 (see FIG. 2) of the collection plate 16, and a closed bottom 56 (see FIG. 4) for containing the liquid component. The collection plate 16 may include any number of such wells 52, with a 96-well collection plate being a typical example. Adjoining collection wells 52 may share a common wall 58.

Importantly, in accordance with the present invention, the vacuum collar 14 is adapted to interface and interconnect the separation plate 12 and the collection plate 16. More specifically, as shown in FIG. 2, the vacuum collar 14 includes inner wall 62 defining a generally central space 64, and an outer wall 66. Space 64 is sized to receive the lower portion 48 of the separation plate 12 and the face 54 of the collection plate 16.

When the vacuum collar 14 is interconnected between the separation plate 12 and the collection plate 16, each one of the collection wells 52 is aligned with an associated one of the filtration wells 22. In the shown embodiment, the vacuum collar 14 is adapted to position the outlet tips 39 of the filtration wells 22 a specified distance into the collection wells 52, thereby insuring that filtrates or eluates will not contaminate adjoining wells.

A chamber 68 to which a vacuum can be applied is defined between the separation plate 12, collection plate 16, and inner wall 62; see FIG. 4. In addition to the hose barb connector 18, the vacuum collar 14 may include a valve 70 in communication with the chamber 68. The valve 70 may be used to facilitate venting of the system as needed, through port 72, and may be opened and closed by means of handle 76. In addition, turning back to FIG. 1, in another aspect of the invention, the valve 70 may include a second port 78, comprising for example a female Luer fitting, for enabling serial connection of multiple multi-well filtration apparatuses 10 in accordance with the invention. Advantageously, the port 78 can be utilized as a means for interconnecting the vacuum collar 14 with another vacuum collar in accordance with the invention. Thus, a plurality of multi-well filtration apparatus 10 in accordance with the invention may be connected and operated by means of a single vacuum source. Cap 79 is provided for sealing the second port 78 when not in use. It is to be appreciated that although only one specific arrangement is shown, there are many different possible valve arrangements for providing vacuum to the system in accordance with the invention, using inexpensive valves and/or hose barb connectors (not shown).

In operation, the apparatus 10 is assembled as shown in FIGS. 1 and 4. Specimen samples are deposited in a conventional manner into the filtration wells 22. A vacuum source (not shown), connected to the hose barb connector 18 is activated. A valve member 70 (see FIGS. 1 and 3) is placed in an open position. Air in the chamber 68 is drawn through port 72 (see FIG. 4) and a partial vacuum is produced within the chamber 68. This partial vacuum will assist in drawing biological fluid within in each filtration well 22 through the filter 24 or other separation media. The filtered fluid, or "filtrate" will drip into the corresponding collection well 52.

Although not shown, the collar 14 in accordance with the invention may include a valve specifically for controlling a pressure differential in the chamber such that depending upon the application, the differential in the chamber 68 can be adjusted between a low pressure differential and a relatively higher pressure differential.

It is also noted that the vacuum collar 14 may further include means for ensuring that the separation plate 22 and the collection plate 16 are always aligned in the appropriate direction. Attention is directed again to FIGS. 1 and 3, where it is shown that the separation plate 12 includes a beveled area 95 on the rectangular portion 46 that will only fit in the vacuum collar 14 when positioned properly within keyed area 96. Similarly, as shown in FIG. 2, the collection plate 16 includes a beveled area 97 on its rectangular portion 16 that will only fit within the vacuum collar when positioned properly to the vacuum collar's keyed area 98. These keyed areas 96 and 98 of the vacuum collar 14 will only accept the separation plate 12 and the collection plate 16 in one orientation ensuring proper alignment of the separation plate 12 and the collection plate 16.

Figure 5:
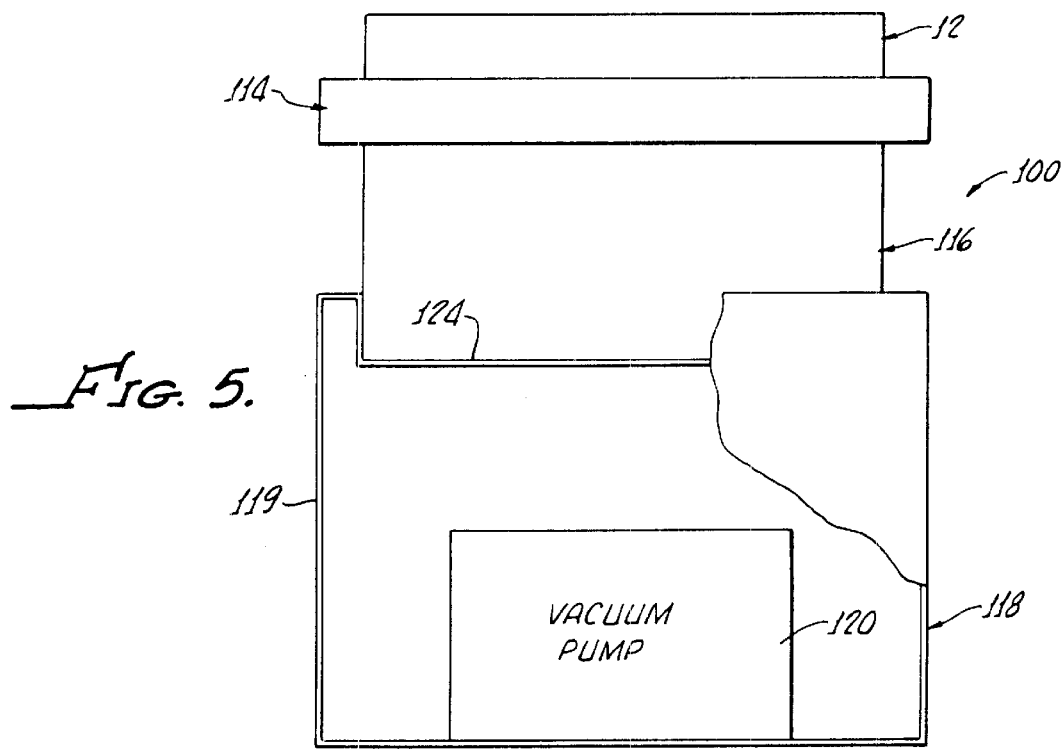
FIG. 5 shows a partially cut away side view of another multi-well filtering apparatus in accordance with the present invention.
Figure 6:
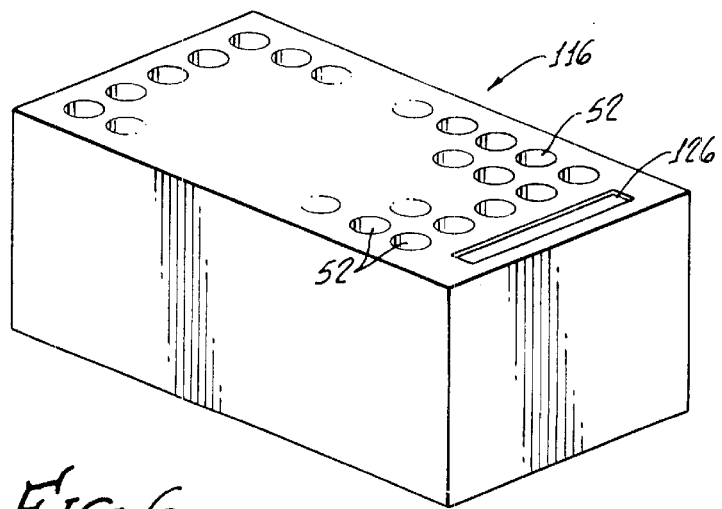
FIG. 6 shows a collection plate of the multi-well filtering apparatus shown in FIG. 5.
Figure 7:
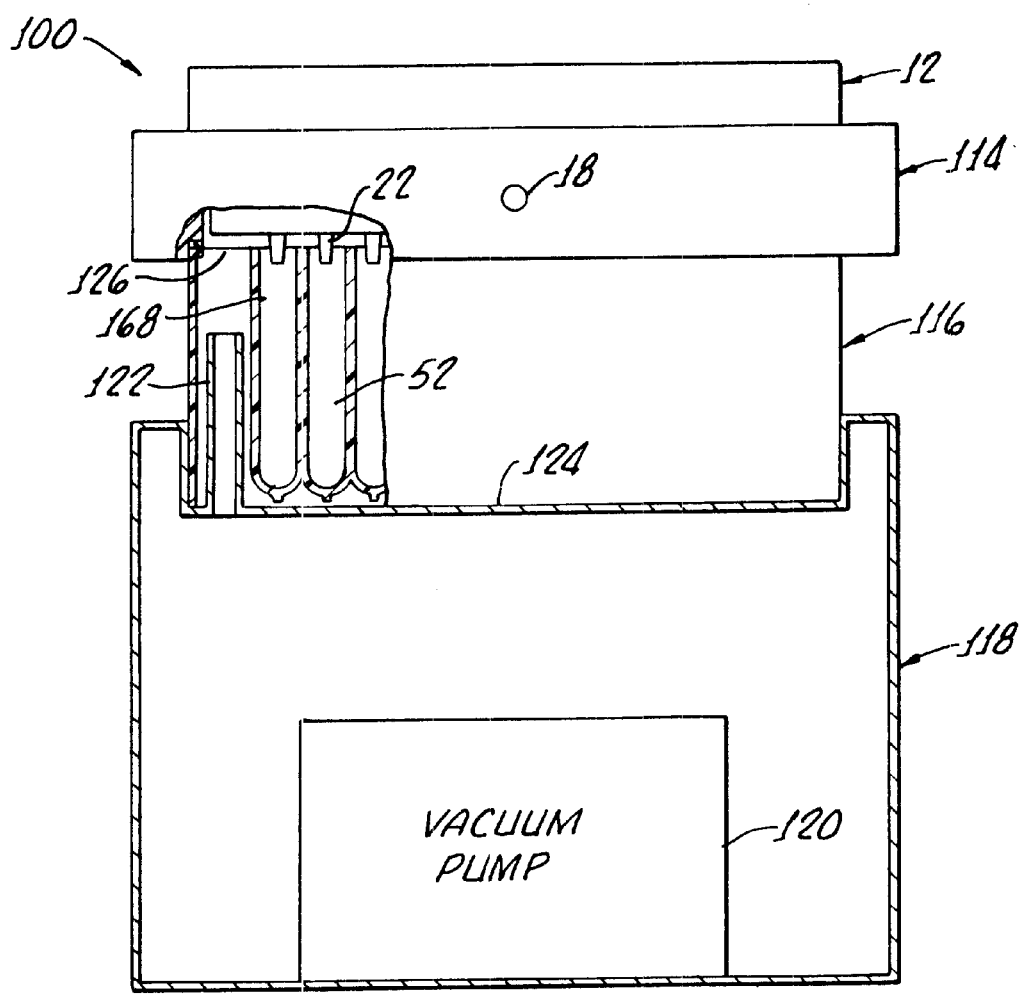
FIG. 7 shows a cross sectional view of the apparatus taken across line 7—7 of FIG. 5.

Turning now to FIGS. 5–7 another multi-well filtration apparatus 100 in accordance with the present the invention is shown, with features similar or identical to those described hereinabove having like reference numbers for the sake of convenience. More particularly, this embodiment 100 generally comprises a multi-well separation plate 12, a vacuum collar 114, a collection plate 116, and a vacuum assembly 118 in a stacked relationship.

The vacuum assembly 118 may include comprise a housing 119, an internal vacuum mechanism, more specifically a vacuum pump 120, disposed in the housing 1 19 and an air intake member 122 extending upward from the housing 119. The housing 119 may include a recessed upper surface 124 configured to contain the collection plate 116 as shown. The vacuum pump 120 may be any suitable vacuum pump, for example such as a vacuum pump available from KNF Neuberger, Inc. The air intake member 122 may extend from the recessed surface of the housing as shown and may be elongated or slot-like in shape.

The collection plate 116 (see FIG. 6) includes means, for example vent opening 126, for receiving the air intake member 122 when the collection plate 116 is stacked on the recessed surface 124 of the vacuum housing 119. The vent opening 126 preferably conforms to the dimensions of the air intake member 122 and extends across a substantial portion of a width of the collection plate 116 as shown. This design provides a substantially uniform vacuum distribution across the chamber 168.

The vacuum collar 114 may be identical to the collar 14 described hereinabove. However, it will be appreciated that in this embodiment 100, the vacuum collar 114 does not require a separate vacuum connector 18 or other vacuum connections or manifolds. Air is drawn from a vacuum chamber 168, defined between the vacuum collar 114, collection plate 116 and separation plate 12), directly through the air intake member 122 received in the vent opening 126 of the collection plate 116.

Advantageously, this embodiment 100 provides vacuum processing of multiple biological fluid samples, through the stacking of the separation plate 12, collection plate 114 and vacuum assembly 118 in a tower-like relationship. It can be appreciated that this embodiment 100 does not require a substantial area of table or counter space to operate.

Although there has been hereinabove described a multi-well filtration apparatus, in accordance with the present invention, for purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A multi-well filtration/solid phase extraction apparatus for use with a multi-well separation plate and a multi-well collection plate, the apparatus comprising:
   a vacuum collar adapted to be stacked between a multi-well separation plate and to a multi-well collection plate, the vacuum collar including a chamber providing a substantially air tight interface between the multi-well separation plate and the multi-well collection plate when the vacuum collar is stacked between the multi-well separation plate and the multi-well collection plate; and
   a connector for connecting the vacuum collar chamber to a vacuum source in order to deliver vacuum within the collection plate.

2. The apparatus according to claim 1 wherein the vacuum collar is adapted to be connected to a conventional ninety-six well separation plate.

3. The apparatus according to claim 2 wherein the vacuum collar is further adapted to be connected to a conventional ninety-six well collection plate.

4. The apparatus according to claim 1 further comprising keyed structure for ensuring appropriate alignment between the separation plate and the collection plate to reduce possibility of error in eluate or filtrate transfer.

5. The apparatus according to claim 1 further comprising a port, disposed on the vacuum collar, for enabling interconnection of the vacuum collar with another vacuum collar to enable a plurality of multi-well filtration/solid phase extraction apparatus to be operated from a single vacuum source.

6. A multi-well filtration/solid phase extraction apparatus comprising:
   a separation plate including multiple separation wells for receiving and filtering a biological fluid sample;
   a collection plate including multiple collection wells for receiving filtrate from the multiple separation wells;
   a vacuum collar adapted to be stacked between the separation plate and the collection plate for defining an a substantially air-tight chamber between the separation plate and the collection plate; and
   a connector disposed on the vacuum collar, for connecting the vacuum collar chamber to a vacuum source in order to deliver vacuum within the collection plate.

7. The apparatus according to claim 6 wherein the multiple separation wells include about ninety-six wells.

8. The apparatus according to claim 6 wherein the multiple collection wells includes about ninety-six multiple collection wells defined in the collection plate.

9. The apparatus according to claim 6 further comprising keyed structure for ensuring appropriate alignment between the separation plate and the collection plate to reduce possibility of error in eluate or filtrate transfer.

10. The apparatus according to claim 6 further comprising a port, disposed on the vacuum collar, for enabling interconnection of the vacuum collar with another vacuum collar to enable a plurality of multi-well filtration/solid phase extraction apparatus to be operated from a single vacuum source.

11. A multi-well filtration/solid phase extraction apparatus comprising:
   a separation plate including multiple separation wells for receiving and separating a biological fluid specimen;
   collection plate, including multiple collection wells for receiving a liquid component of the biological fluid specimen, the collection plate including a vent opening;
   a collar for connecting the collection plate with the separation plate in an interfacing relationship; and
   a vacuum assembly including a housing adapted to receive the collection plate in a stacked configuration therewith, an air intake member configured to be received by the vent opening of the collection plate, and a vacuum mechanism for drawing air through the vent opening and air intake member when the collection plate is disposed on the vacuum assembly in the stacked configuration to enable vacuum processing of the biological fluid specimen received in the separation plate.

12. The apparatus according to claim 11 wherein the vacuum mechanism comprises a vacuum pump disposed in the vacuum assembly housing.

13. The apparatus according to claim 11 wherein the separation plate comprises a ninety-six well separation plate.

14. The apparatus according to claim 13 wherein the collection plate comprises a ninety-six well collection plate.

* * * * *